US008531334B2

(12) United States Patent
Wolman et al.

(10) Patent No.: US 8,531,334 B2
(45) Date of Patent: Sep. 10, 2013

(54) LOCATION PROOFS (75) Inventors: Alastair Wolman, Seattle, WA (US); Stefan Saroiu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/613,540

(22) Filed: Nov. 6, 2009

(65) Prior Publication Data
US 2011/0109508 A1   May 12, 2011

(51) Int. Cl.
*H04K 1/00* (2006.01)
(52) U.S. Cl.
USPC .......................... 342/386; 455/411; 380/258
(58) Field of Classification Search
USPC .......................................................... 342/386
See application file for complete search history.

(56) References Cited

U.S. PATENT DOCUMENTS

| 6,377,810 | B1 | 4/2002 | Geiger et al. |
| RE38,899 | E * | 11/2005 | Fischer .......................... 380/258 |
| 7,149,503 | B2 | 12/2006 | Aarnio et al. |
| 2009/0198623 | A1 | 8/2009 | Rubinstein |

FOREIGN PATENT DOCUMENTS

EP          1708527        * 10/2006

OTHER PUBLICATIONS

"Suitability of Positioning Techniques for Location-Based Services in Wireless LANs", Retrieved at <<http://www.wpnc.net/fileadmin/WPNC05/Proceedings/Suitability_of_Positioning_Techniques_for_Location-based_Services_in_wireless_LANs.pdf>>, In the Roceedings of the 2nd Workshop on Positioning, Navigation and Communication & 1st Ultra-Wideband Expert Talk, 2005, pp. 51-56.
Mahmoud, Qusay H., "Provisioning Context-Aware Advertisements to Wireless Mobile Users", Retrieved at <<http://ieeexplore.ieee.org/stamp/stamp.jsp?arnumber=04036688>> In the proceedings of IEEE International Conference on Multimedia and Expo, Jul. 9-12, 2006, pp. 669-672.
Sastry, et al., "Secure Verification of Location Claims" Retrieved at <<http://naveen.ksastry.com/papers/locprove-wise03.pdf>> In the proceedings of the 2nd ACM workshop on Wireless security Sep. 19, 2003, pp. 1-10.
Chaing, et al., "Secure and Precise Location Verification using Distance Bounding and Simultaneous Multilateration", Retrieved at http://users.crhc.illinois.edu/yihchun/pubs/wisec09.pdf>>, In the proceedings of the conference on Wireless network security, Mar. 16-19, 2009, pp. 181-192.

(Continued)

*Primary Examiner* — Gregory C Issing
(74) *Attorney, Agent, or Firm* — Medley, Behrens & Lewis, LLC (57) ABSTRACT A wireless computing device includes an antenna that is configured to transmit and receive wireless signals. The wireless computing device comprises a transmitter component that causes a first wireless signal to be transmitted to a wireless access point via the antenna, wherein the first wireless signal comprises a request for a location proof, wherein the request for the location proof comprises data that identifies the wireless computing device, and wherein the location proof comprises data that is indicative of a geographic location of the wireless access point. The system also includes a receiver component that receives, via the antenna, a second wireless signal from the wireless access point, wherein the second wireless signal is received by the receiver component subsequent to the transmitter component causing the first wireless signal to be transmitted to the wireless access point.

20 Claims, 6 Drawing Sheets (56) References Cited

OTHER PUBLICATIONS

"Leveraging Next Generation Imaging Capabilities in Enterprise Applications", Retrieved at <<http://www.motorola.com/staticfiles/Business/Products/Mobile%20Computers/Handheld%20Computers/_Documents/staticfile/MC75_AB_PressQuality_0608.pdf>> Aug. 19, 2009, pp. 1-4.

"The Mobility Advantage: Reduce Cost, Generate Revenue and Increase Operational Efficiency for State and Local Agencies", Retrieved at <<http://www.motorola.com/staticfiles/Business/Products/Mobile%20Computers/_Documents/_StaticFiles/SL_MobilityBenefits_RO_14_2002.pdf?localeId=33>> Aug. 19, 2009, pp. 1-8.

Capkun, eta al., "Secure Positioning of Wireless Devices with Application to Sensor Networks", Retrieved at <<http://www.terminodes.org/getDoc.php?docid=942&docnum=1>> Mar. 13-17, 2005, pp. 1-12.

Denning, et al., "Location-Based Authentication: Grounding Cyberspace for Better Security", Retrieved at <<http://www.cosc.georgetown.edu/~denning/infosec/Grounding.txt>> Feb. 1996, pp. 1-5.

Ford, et al., "An Offline Foundation for Online Accountable Pseudonyms", Retrieved at <<http://pdos.csail.mit.edu/papers/accountable-pseudonyms-socialnets08.pdf>> In the proceedings of the 1st Workshop on Social Network Systems, Apr. 1, 2008, pp. 1-6.

Monroe, et al., "OpenID Service Key Discovery", Retrieved at <<http://openid.net/specs/openid-service-key-discovery-1_0-01.html>>, Aug. 17, 2009, pp. 1-3.

"Google Accounts", Retrieved at <<http://google.com/accounts>> 2009, p. 1.

Gruteser, et al., "Anonymous Usage of Location-Based Services through Spatial and Temporal Cloaking", Retrieved at <<http://systems.cs.colorado.edu/Papers/Generated/2003anonymousLbs.pdf>> In the proceedings of the 1st international conference on Mobile systems, applications and services, 2003, pp. 1-12.

Heskett, et al., "Putting the Service-Profit Chain to Work", Retrieved at <<http://pegasus.cc.uctedu/~fottler/servicearticle.pdf>>—Mar.-Apr. 1994, pp. 164-175.

Jiang, et al., "Location Privacy in Wireless Networks", Retrieved at <<http://research.microsoft.com/en-us/um/people/helenw/papers/locationprivacy.pdf>> In the proceedings of MobiSys'07, Jun. 11-13, 2007, pp. 1-12.

Lenders, et al., "Location-Based Trust for Mobile User-generated Content: Applications, Challenges and Implementations", Retrieved at <<http://www.ece.cmu.edu/~peizhang/publications/lenders_geotrust.pdf>> In the proceedings of the 9th workshop on Mobile computing systems and applications, 2008, pp. 1-5.

"MaxMind GeoIP Database", Retrieved at <<http://www.maxmind.com/app/ip-location>> Aug. 17, 2009, p. 1.

"Microsoft. Windows Live ID", Retrieved at http://accountservices.passport.net>>, Aug. 17, 2009, p. 1.

"OpenID", Retrieved at <<http://openid.net/>> Aug. 17, 2009, pp. 1-2.

Pang, et al., "802.11 User Fingerprinting", Retrieved at <<http://nms.csail.mit.edu/~ramki/mobicom07.pdf>> In the Proceedings of the 13th annual ACM international conference on Mobile computing and networking, Sep. 9-14, 2007, pp. 1-12.

Tootoonchian, et al.,"Lockr: Social Access Control for Web 2.0", Retrieved at <<http://www.lockr.org/papers/lockr-wosn.pdf>> Aug. 18, 2008, p. 43-48.

Naraine, et al., "Inside India's CAPTCHA Solving Economy", Retrieved at <<http://blogs.zdnet.com/security/?p=1835>> Aug. 29, 2008, pp. 1-6.

Zhang, et al., "Power-Modulated Challenge-Response Schemes for Verifying Location Claims", Retrieved at <<http://www.winlab.rutgers.edu/~trappe/Papers/PowerMod_globecom.pdf>> In the Proceedings of the Global Telecommunications Conference, 2007. IEEE2007, Nov. 26-30, 2007, pp. 39-43.

\* cited by examiner

LOCATION PROOFS

BACKGROUND

Advances in technology have enabled relatively small computing devices to be associated with ever-increasing functionality. For example, many portable telephones are equipped with an operating system that allows various tasks to be performed using such portable telephones. These tasks include but are not limited to word processing, web browsing, mobile banking, amongst other tasks. Furthermore, many mobile devices that are not conventionally associated with an ability to communicate wirelessly are now equipped with wireless functionality. For example, portable multimedia players are currently equipped with antennas that allow signals to be transmitted wirelessly to and from the portable multimedia device. In another example, digital cameras are often equipped with antennas to allow the digital camera to communicate with a host device such as a personal computer.

Additionally, many currently available wireless devices are equipped with hardware and/or software that enables the device to determine its current location. For example, a portable telephone may include a global positioning system transceiver that can be utilized to determine a current location of the portable telephone. Thus, for instance, if a user of the portable telephone dials an emergency number, the current location of the portable telephone can be transmitted to the receiver of the call. Accordingly, an emergency response unit can quickly ascertain the geographic location of the user of the portable telephone. In another example, a portable device may transmit GPS coordinates to a server that, upon receipt of the GPS coordinates, can transmit map information to the portable device such that the portable device can cause a map to be displayed to the user that illustrates a current location of the user.

Currently, however, there is no suitable mechanism that can verify that a location of a mobile device transmitted to another application has not been tampered with by the owner of the mobile device (or other malicious person) or software running on the mobile device, such as drivers, an operating system, or other applications. For instance, GPS traces can be stored in memory of a mobile computing device and a user of such device may access the memory and modify coordinates in the GPS traces. An application that receives the GPS trace would have no indication that coordinates provided by the mobile computing device were subject to tampering.

SUMMARY

The following is a brief summary of subject matter that is described in greater detail herein. This summary is not intended to be limiting as to the scope of the claims.

Described herein are various technologies pertaining to generating and using a location proof that indicates that a wireless computing device has been at a particular geographic location. As used herein, a location proof is a packet of data generated by a wireless access point that comprises an indication of location of the wireless access point. To prevent against tampering, the location proof may additionally include data that identifies a wireless access point that generates the location proof and data that identifies the mobile/wireless computing device that receives the location proof. Such data can be encrypted using, for instance, public keys. In other words, a location proof is a piece of data that certifies a geographic location. Wireless access points can embed the geographic location corresponding thereto in a location proof and the wireless access point can transmit the location proof to a designated recipient device. The location proof may include various fields such as a field that identifies an issuer of the location proof, a field that identifies a recipient of the location proof, a time stamp that identifies when the location proof was generated by the wireless access point, a geographical location corresponding to the wireless access point and a digital signature of the wireless access point. As indicated above, public keys can be used to represent the identities of the issuer and the recipient of the location proof.

In an example embodiment, a wireless access point can periodically or from time to time transmit beacon signals that are conventionally employed to notify wireless devices of the existence of the wireless access point. Included in such beacon signals may be an indication that the wireless access point is configured to generate a location proof. A wireless computing device can receive the beacon signal and, in response thereto, can generate a request for a location proof and transmit such request to the wireless access point. In response to receiving the request, the wireless access point can generate the location proof and transmit the location proof to the wireless computing device. The location proof may then be stored in a data repository in the wireless computing device. The wireless computing device may provide the location proof to an application (e.g., executing on another computing device) that uses the location proof as an input.

While the above example describes a wireless access appoint generating the location proof, it is to be understood that any suitable device in a network infrastructure can be employed in connection with generating the location proof. For instance, the network may be cellular telephone network, in which case a base station can generate the location proof. In another example, a base station can pass on the request for the location proof to a gateway mobile switching center device which can have knowledge of the location of the base station and can generate the location proof and provide such location proof to the base station, which in turn can transmit the location proof to the wireless computing device. Other devices that can be configured to generate location proofs include a mobile switching center server, a home location register server, or other suitable cellular network infrastructure device. Similarly, in a Wi-Fi network, a wireless router can be configured to generate the location proof. In another example, some other suitable infrastructure device can be configured to generate the location proof such as a modem, a bridge, or some other suitable device.

Other aspects will be appreciated upon reading and understanding the attached figures and description.

DETAILED DESCRIPTION

Various technologies pertaining to generating and using a data packet that indicates geographical location of a wireless access point will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
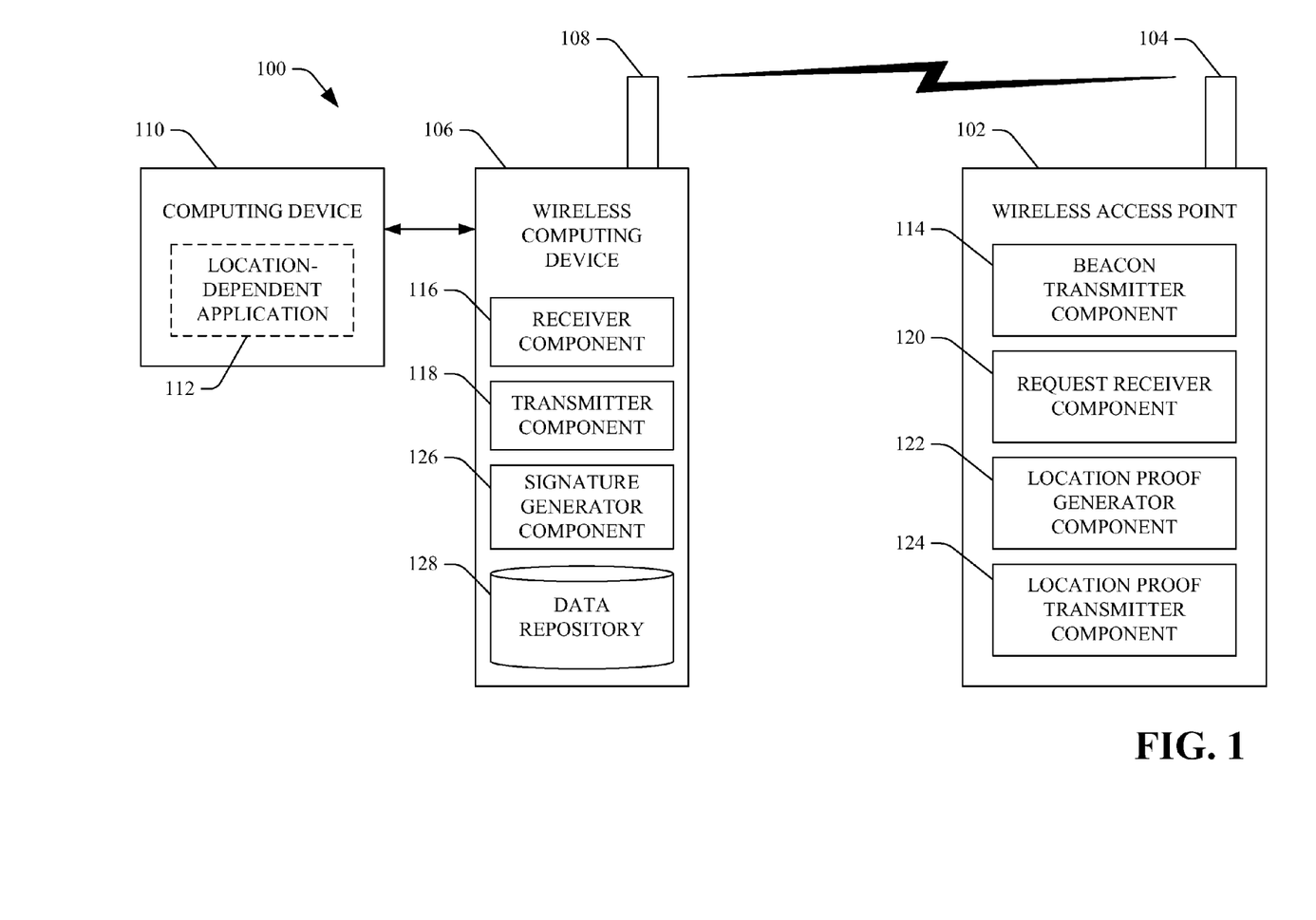
FIG. 1 is a functional block diagram of an example system that facilitates generating and using location proofs.

With reference to FIG. 1, an example system 100 that facilitates providing a location proof to an application that utilizes location of a wireless computing device as an input is illustrated. The system 100 includes a wireless access point 102 that can be configured to receive and transmit wireless signals with respect to one or more wireless computing devices. For example, the wireless access point 102 may be a wireless access point in a wireless local area network, a wireless access point in a wide area network, a wireless access point in a cellular network or an access point in some other suitable network. Thus, the wireless access point 102 can be or include a wireless router, a wireless modem, a base station, a cellular telephone tower, or some other suitable device. Furthermore, while the description herein discusses functionality undertaken by a wireless access point, it is to be understood that some functionality may be undertaken by other devices in a wireless network infrastructure. The wireless access point 102 can comprise an antenna 104 that can be configured to receive and transmit wireless signals. For example, the antenna 104 may be configured to receive and transmit Wi-Fi signals, cellular signals or other suitable wireless signals.

The system 100 also includes a wireless computing device 106, which can be any suitable wireless device including, but not limited to, a portable telephone, a portable multimedia player, a laptop computer, a desktop computer with wireless functionality, a digital camera or other suitable device. The wireless computing device 106 includes an antenna 108 that is configured to receive and transmit wireless signals. For instance, the antenna 108 can be configured to receive and transmit Wi-Fi signals or other 802.11 signals, Bluetooth signals, cellular signals or other suitable wireless signals. The wireless access point 102 can transmit wireless signals to the wireless computing device 106 by way of the antenna 104 and the wireless computing device 106 can receive such wireless signals through use of the antenna 108. Additionally, the wireless computing device 106 can transmit wireless signals via the antenna 108 to the wireless access point 102 and the wireless access point 102 can receive such signals via the antenna 104.

The system 100 further includes a computing device 110 that is in communication with the wireless computing device 106. For example, the computing device 110 may be a host device such as a personal computer that can transmit and receive data wirelessly (e.g., by way of the antenna 108 and an antenna (not shown) of the computing device 110). In another example, the wireless computing device 106 may be coupled to the computing device 110 by way of a USB connection or other suitable connection. In yet another example, the computing device 110 may be a server that can be in communication with the wireless computing device 106 by way of one or more intermediate devices (e.g., the wireless access point 102) or other suitable connection. Thus, the computing device 110 may reside "in the cloud." The computing device 110 may execute a location dependent application 112 which can utilize location(s) of the wireless computing device 106 as an input (e.g., use location proofs transmitted by the wireless computing device 106 as inputs). Various example location dependent applications that can be executed by the computing device 110 are described in greater detail below.

The wireless access point 102 can optionally include a beacon transmitter component 114. For example, the wireless access point 102 can be a Wi-Fi access point and the beacon transmitter component 114 can be configured to periodically or from time to time broadcast beacon frames to announce the presence of the wireless access point 102 to wireless computing devices in proximity to the wireless access point 102. Wireless computing devices such as the wireless computing device 106 can be configured to receive beacon signals transmitted from the wireless access point 102 when the wireless computing device 106 is connected to a Wi-Fi network. For example, even if the wireless computing device 106 is connected to a different wireless access point, the wireless computing device 106 can periodically or from time to time scan a plurality of channels to receive beacon signals from other wireless access points so that the wireless computing device 106 can keep track of other available wireless access points in case the primary access point becomes unreachable.

The beacon transmitter component 114 can be configured to cause the antenna 104 to transmit such beacon signals. A beacon signal transmitted by the wireless access point 102 may include an indication that the wireless access point 102 (or some other network infrastructure device in communication with the wireless access point 102) is capable of generating and transmitting a location proof to the wireless computing device 106. For instance, such indication may be a setting of a certain bit in a beacon frame transmitted by the wireless access point 102, a message in a beacon signal transmitted by the wireless access point 102 or some other suitable indication. As used herein, a location proof is a piece of data that can certify a geographic location of the wireless access point 102. For instance, the wireless access point 102 can embed a geographical location corresponding thereto in a location proof. The geographical location may be latitude/longitude coordinates, an address or other suitable location data. Furthermore, as will be described in detail below, the location proof may be resistant to tampering and may further be resistant to transfer.

The wireless computing device 106 may include a receiver component 116 that causes the wireless computing device 106 to scan a plurality of channels for beacon signals transmitted by one or more wireless access points. Additionally, the receiver component 116 can analyze a received beacon signal to ascertain whether an access point that transmitted the beacon signal is capable of generating a location proof. For instance, the receiver component 116 can receive a beacon signal transmitted by the wireless access point 102 and, upon analyzing such beacon signal, can ascertain that the wireless access point 102 is capable of transmitting a location proof to the wireless computing device 106.

The wireless computing device 106 may additionally include a transmitter component 118 that can cause a first wireless signal to be transmitted from the wireless computing device 106 to the wireless access point 102 via the antenna 108. The first wireless signal can include a request for a location proof, wherein such request for the location proof can comprise data that identifies the wireless computing device 106 or a user of the wireless computing device 106. For instance, the data that identifies the wireless computing device 106 may be a serial number of the wireless computing device 106, data in a SIM card of the wireless computing device 106, an identity corresponding to a single identity provider, an open ID identifier, a PGP identifier, an e-mail address of the user of the wireless computing device 106, some known pseudonym for a user of the wireless computing device 106 or other suitable data that can identify the wireless computing device 106 or a user thereof. The beacon transmitter component 114 in the wireless access point 102 can cause a beacon signal to be transmitted that includes an indication that the wireless access point 102 is capable of generating location proofs and such beacon signal can be received and analyzed by the receiver component 116. Responsive to the receiver component 116 determining that the wireless access point 102 is capable of generating a location proof, the transmitter component 118 can generate the request and cause the antenna 108 to transmit the first wireless signal that includes the request to the wireless access point 102.

The wireless access point 102 may include a request receiver component 120 that receives the request generated by the transmitter component 118 in the wireless computing device 106 by way of the antenna 104 of the wireless access point 102. A location proof generator component 122 can be in communication with the request receiver component 120 and may generate a location proof responsive to the request receiver component 120 receiving the request from the wireless computing device 106. As will be described in greater detail below, the location proof generator component 122 can generate a location proof that comprises a geographic location of the wireless access point 102, a time stamp indicating when the location proof generator component 122 generated the location proof, a signature of the wireless access point 102 or a signature of a network that controls the wireless access point 102, an indication of identity of the wireless computing device 106 that transmitted the request for the location proof and an indication of the identity of the wireless access point 102 which is to generate the location proof.

The wireless access point 102 may also comprise a location proof transmitter component 124 that causes the wireless access point 102 to transmit the location proof generated by the location proof generator component 122 to the wireless computing device 106 via the antenna 104. The location proof transmitter component 124 can cause the location proof to be transmitted together with other data transmitted to the wireless computing device 106 in a second wireless signal. Alternatively, the location proof transmitter component 124 can cause the wireless access point 102 to generate and transmit a second wireless signal that includes only the location proof generated by the location proof generator component 122. The receiver component 116 in the wireless computing device 106 can cause the wireless computing device 106 to receive the second wireless signal via the antenna 108. The second wireless signal is received by the receiver component 116 subsequent to the transmitter component 118 transmitting the first wireless signal to the wireless access point 102.

The wireless computing device 106 may also comprise a signature generator component 126 that generates a signature for the wireless computing device 106 and appends such signature to the location proof received by the receiver component 116 via the antenna 108. Additionally, the signature generator component 126 can cause a public key that identifies the wireless computing device 106 and/or the user thereof to be pre-pended to the location proof. The wireless computing device 106 additionally includes a data repository 128 that can be utilized to retain location proofs received from one or more wireless access points. Such data repository 128 may be memory, a hard drive or other suitable data storage technology.

The wireless computing device 106, upon signing the location proof, can present such location proof to the location dependent application 112 executing on the computing device 110. The location dependent application 112 can thereafter verify the location proof. For instance, the location dependent application 112 can check the signature generated by the signature generator component 126 to ensure that the location proof has not been tampered with while transmitted from the wireless computing device 106 to the computing device 110. The location dependent application 112 may also check the signature of the wireless access point 102 in the location proof generated by the location proof generator component 122 to ensure that the user of the wireless computing device 106 has not tampered with the location proof. Additionally, the location dependent application 112 can verify that the wireless computing device 106 was the intended recipient of the location proof (e.g., by comparing an identity of the wireless computing device 106 in the location proof generated by the generator component 122 with the signature generated by the signature generator component 126 of the wireless computing device 106). Upon the location dependent application 112 performing such checks, the location dependent application 112 can determine whether or not the location proof is legitimate.

As indicated above, the location dependent application 112 may be any suitable application that utilizes geographic location of the wireless computing device 106. In particular, the location dependent application 112 may be an application that utilizes geographic data, wherein there may be an incentive or fear that the geographic data has been subjected to tampering. A first example of a location dependent application that utilizes location data of the wireless computing device 106 may be an application executed by a store that provides loyalty discounts to customers that have frequently visited the store. For instance, retaining customers offers many benefits to a store and loyal customers are more likely to recommend the store to others, are more willing to try new products and spend more money and their feedback is often more helpful. Accordingly, stores often actively look for new ways to retain their loyal customers by providing them with discounts, coupons or other rewards. Thus, the location dependent application 112 may be configured to offer discounts to customers who visit the store repeatedly or who spend a significant amount of time in the store. In this example, the wireless computing device 106 may gather location proofs from a wireless access point inside the store. When a discount is available, a customer may prove that they have been inside the store numerous times or for a threshold amount of time by presenting location proofs to the location dependent application 112 executing on the computing device 110. In another example, the location dependent application 112 may be an application used in a restaurant that provides priority seating for frequent customers, wherein the location dependent application 112 executing on the computing device 110 receives location proofs from the wireless computing device 106 that proves that the wireless computing device 106 was in the restaurant a certain number of times or for a particular amount of time.

In yet another example, the location dependent application 112 may be an application that provides incentives for commuters in a heavy traffic area. Specifically, carbon emissions may be a cause of global warming and one of the main factors contributing to carbon emissions is car travel. Thus, companies in organizations may seek ways to reduce car travel by providing incentives for employees to find alternative commuting options. For instance, some companies provide rewards for employees who choose to walk, bike or utilize public transportation to travel to a place of business rather than drive an automobile. The location dependent application 112 can ascertain that an individual is walking to work by analyzing locations corresponding to the owner of the wireless computing device 106 as such owner travels to work and timestamps of location proofs. That is, timestamps and location proofs can provide an accurate indication of a method used by an individual to travel to work.

In still yet another example, the location dependent application 112 may be an application that selectively provides content based on location of the wireless computing device 106. For instance, an emerging class of web content delivery applications are those that deliver television programming which is subject to complicated copyright laws that restrict broadcast of such content to certain countries, for instance. Thus, the location dependent application 112 may be an application that provides content that may be restricted to geographic location and utilizes location proofs as an input prior to transmitting such content to the wireless computing device 106. In another example, the location dependent application 112 may be configured to reduce fraud on auction web sites, for instance. A common security problem on auction web sites is account theft-attackers break into legitimate accounts and use their established reputations to commit fraud. Oftentimes such attackers are from geographically remote locations. The location dependent application 112 could utilize a location proof to ensure that the account owner is in a geographical location that is known to correspond to such account owner. For example, once bidding on an item is complete, the seller of an item may be requested to provide the location dependent application 112 with a location proof that validates geographical location to the buyer. The buyer may then, for example, check to make sure that the location encapsulated in the location proof sufficiently matches the location in the known profile of the seller.

In still yet another example, the location dependent application 112 may be an application utilized in police investigations. For instance, many police investigations are quickly resolved by examining alibis of persons involved or thought to be involved in an incident. If examining alibis does not lead to an obvious suspect, police investigations become more lengthy and more costly. In such a case the location dependent application 112 may be an application that can verify alibis provided by certain parties. For instance, a person of interest can provide location proofs collected by a mobile device in support of an alibi.

In still yet another example, the location dependent application 112 may be used in connection with registering voters for an election. For example, during an election voters are often asked to provide proof of their presence in a particular region, state or country for a predetermined period of time (often referred to as the "physical presence requirement"). This can sometimes be impossible for certain people to prove. In this case, the location dependent application 112 may be an application that receives location proofs from the wireless computing device 106 to prove that the owner of such wireless computing device 106 had a physical presence in a certain geographic location over a particular amount of time. Of course these applications are exemplary in nature and many other types of applications may utilize locations proofs as an input.

With more detail pertaining to the beacon transmitter component 114, such component 114 can cause a geographic location of the wireless access point 102 to be included in beacon signals transmitted by the wireless access point 102 via the antenna 104. Upon receiving a beacon signal, the wireless computing device 106 can decide whether to explicitly request a location proof from the wireless access point 102. In an example, the wireless computing device 106 (the receiver component 116) can extract the sequence number of the beacon and use such sequence number in the request for the location proof. For instance, transmitting a sequence number of a beacon signal can be utilized in connection with preventing replay attacks.

Furthermore, the request for the location proof from the wireless computing device 106 may include a public key corresponding to the wireless computing device 106 and a signature appended to the sequence number of the beacon signal transmitted by the wireless access point 102. Signing of the sequence number can be utilized to protect integrity of the wireless computing device 106 and to make it difficult for other computing devices to impersonate the wireless computing device 106. The request receiver component 120 and the wireless access point 102 can receive the request transmitted by the wireless computing device 106 and can determine whether the signature in the request is valid and whether the sequence number corresponding to the signature is a current/recent sequence number. If the request for the location proof is invalid, the wireless access point 102 can drop the request silently. If the request is valid, such validity can be provided to the location proof generator component 122 which can generate the location proof as described above.

An identity of the wireless computing device 106 or an owner thereof may be included in the request for the location proof transmitted by way of the transmitter component 118. Many different identity schemes may be utilized in connection with generating location proofs such that it can be verified that a public key embedded in a location proof is uniquely mapped to a single identity. Such schemes may include a single sign-on provider scheme. In this case, whoever verifies the identity of the wireless computing device 106 or a user thereof can have a setup key with a single sign-on server. Once the user authenticates the single sign-on server, the server returns a token encrypted with this key. Correctly decrypting this token allows the verifier to check the identity of the user. Another scheme is the open ID scheme which is a decentralized single sign-on system. The user can register with an open ID identity provider, wherein any suitable web site can be such a provider. An open ID is a URL hosted by the identity provider. The verifier of the identity can contact the provider to verify the identity of the user. In still yet another example, a PGP scheme can be used, wherein a PGP scheme uses a vetting scheme in which people sign each other's public keys. Over time, a PGP scheme creates a web of trust in which people accumulate each other's signatures after verification. To verify a person's signature in PGP, people can find a chain of trust linking the person to themselves. This verification step is typically done by contacting a PGP repository that stores the web of trust.

In still another example, e-mail addresses can be used as identities, where users can demonstrate that they own the e-mail address that they claim as their identity. This is already undertaken by many web sites that send an e-mail containing a URL and asking the user to click on the URL. Another identity scheme may be online accountable pseudonyms, which are anonymous and therefore allow users to maintain privacy. Creating such pseudonyms may require the physical presence of the user in a large social gathering such as a large party to protect the privacy of the user.

It is also to be understood that whether a location proof is received from a wireless access point can be entirely a decision of the user. For instance, the user can configure the wireless computing device 106 to collect location proofs from certain access points while not collecting location proofs from other access points. Further, the user of the wireless computing device 106 may at any time delete location proofs retained in the data repository 128. In another example, the user can configure the wireless computing device 106 to delete location proofs after a particular amount of time has passed from receipt of the location proofs. Furthermore, the wireless computing device 106 may collect location proofs from different wireless access points in a relatively narrow window of time. For instance, the wireless computing device 106 may be associated with the wireless access point 102 such that the wireless access point 102 is the primary access point for the wireless computing device 106. However, the wireless computing device 106 may receive beacon signals from other wireless access points 102 in proximity to the wireless computing device 106. Thus, the wireless computing device 106 may be configured to receive location proofs from multiple wireless access points 102 over a relatively short period of time.

As indicated above, the wireless access point 102 has location information embedded therein. Thus, the wireless access point 102 may have a GPS transceiver embedded therein such that location of the wireless access point 102 can be ascertained and stored in the memory of the wireless access point 102. In another example, the geographic location of the wireless access point 102 can be provided from another network infrastructure device or other trusted source.

As the wireless access point 102 provides the location information, the wireless access point 102 is to be configured with correct location coordinates. As GPS oftentimes does not work well in indoor environments (where the wireless access point 102 may be placed), other mechanisms for providing the wireless access point 102 with correct locations coordinates are contemplated. For instance, the wireless access point 102 can be equipped with a configuration interface for administrators. To install a location proof-enabled access point, the administrator can take the wireless access point 102 outdoors and run a setup program that utilizes GPS to determine the location of the wireless access point 102. After setup, the wireless access point 102 can instruct the administrator that it is ready to be deployed indoors. While this approach can reduce likelihood of misconfigured access points, two additional problems may be introduced: first, error may be introduced because the location where the GPS reading is performed is different from the true location of the wireless access point 102; second, access points are often relocated (e.g., the wireless access point 102 can be sold to another person). To handle relocation, the wireless access point 102 can be re-initialized in a new location. A manner to automate such a process is to provides the wireless access point 102 with an accelerometer that can detect when the wireless access point 102 has been relocated and can force an administrator to re-configure the wireless access point 102 prior to the wireless access point 102 providing service.

Figure 2:
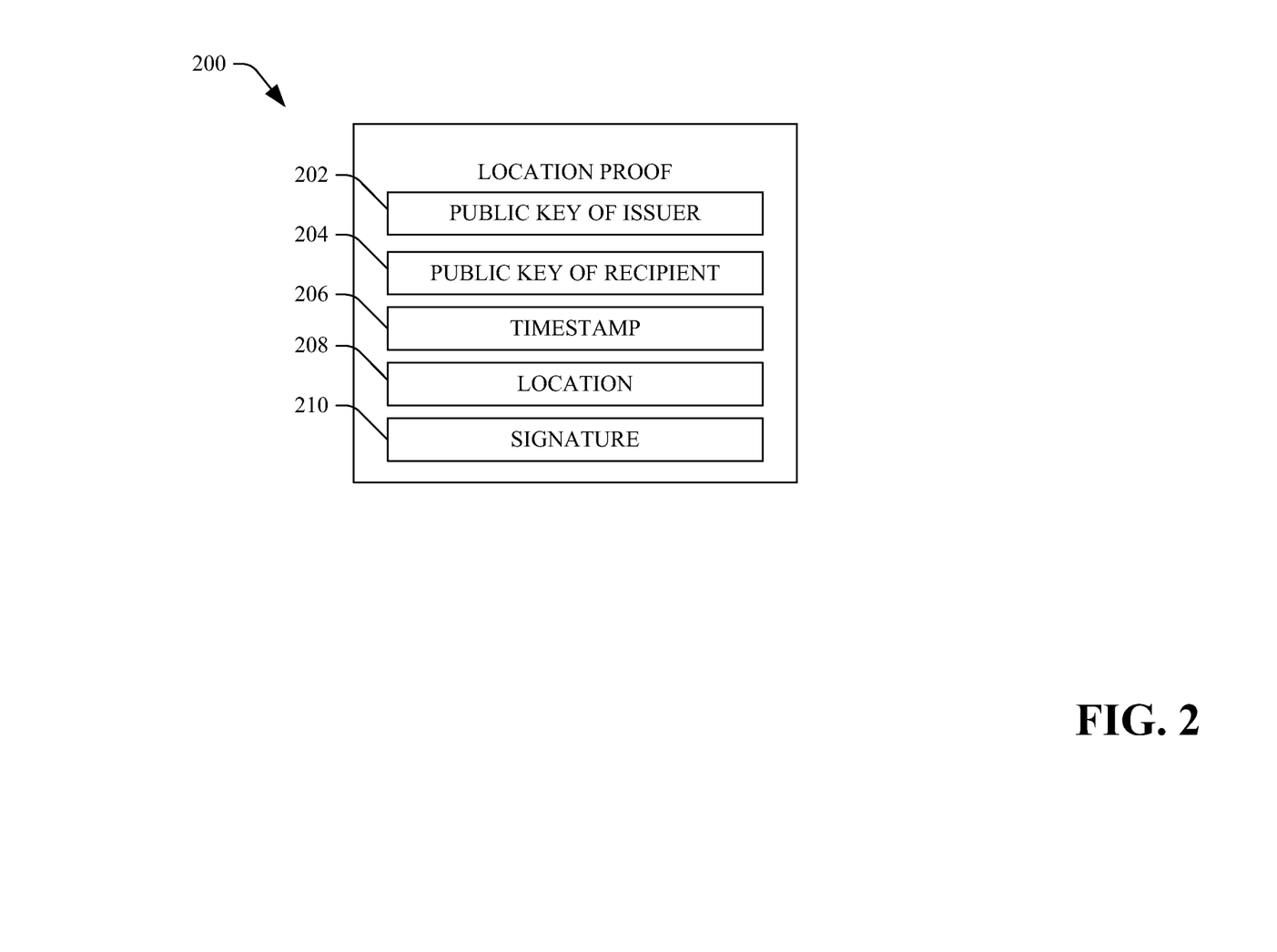
FIG. 2 is functional block diagram illustrating an example location proof.

Referring now to FIG. 2, an example depiction of a location proof 200 is illustrated. While the location proof 200 is shown and described as including particular data structures/data types, it is to be understood that in practice a location proof may include a subset of such data structures and/or data types or may include additional data structures and/or data types. Furthermore, the order of presentation of the data structures and/or data types is not intended to be limiting, as any suitable arrangement of data structure/data types in the location proof 200 is contemplated and intended to fall under the scope of the hereto appended claims. As described above, the location proof 200 is a piece of data that certifies a geographical location of an access point. The example location proof 200 includes five different fields. A first field 202 comprises data that is indicative of an identity of an issuer of the location proof 200. In an example, the issuer of the location proof 200 may be the wireless access point 102 or an organization that operates the wireless access point 102. Furthermore, the first field 202 may comprise a public key that is representative of the identity of the issuer of the location proof 200. The location proof 200 may also include a second field 204 that comprises data indicative of an identity of the recipient of the location proof 200. For example, data in the second field may be indicative of an identity of a particular wireless computing device or a user/owner of the wireless computing device. Thus, the second field 204 may include a user name of an individual, a serial number of a wireless computing device, an e-mail address of an individual, etc. The second field 204 may comprise a public key that represents the recipient of the location proof 200.

The location proof 200 may additionally include a third field 206 that may comprise a time stamp. The time stamp can indicate a time that the location proof 200 was generated by the wireless access point 102 and/or can indicate a time that a request for the location proof 200 was received from the wireless computing device 106. Pursuant to an example, the third field 206 may include a time stamp that has a time in accordance with Greenwich Mean Time such that time stamps from different time zones can be readily reconciled.

The location proof 200 may also comprise a fourth field 208 that includes a location pertaining to the wireless access point 102. For instance, the location may be in latitude/longitude coordinates, may be a street address or may be composed in any other suitable manner for indicating location of the wireless access point 102.

The location proof 200 may also comprise a fifth field 210 that comprises a digital signature of the wireless access point 102. In another example, the fifth field 210 may comprise a signature that corresponds to a controller/operator of the wireless access point 102.

In an example, the location proof 200 may be generated by the wireless access point 102 such that the location proof 200 comprises each of the five fields 202-210 and data corresponding thereto upon transmittal from the wireless access point 102 to the wireless computing device 106. In another example, the location proof 200 may be partially completed. For instance, the second field 204 may be blank and may be completed by the wireless computing device 106 upon receiving the location proof 200.

Pursuant to an example the location proof 200 may be in XML format. An example format is provided below.

```
<locproof>
    <issuer>Issuer's public key</issuer>
    <recipient>Recipient's public key</recipient>
    <timestamp>Timestamp when issued</timestamp>
    <geolocation>
        <latitude>...</latitude>
        <longitude>...</longitude>
    </geolocation>
    <signature>Location proof's signature</signature>
</locproof>
```

Figure 3:
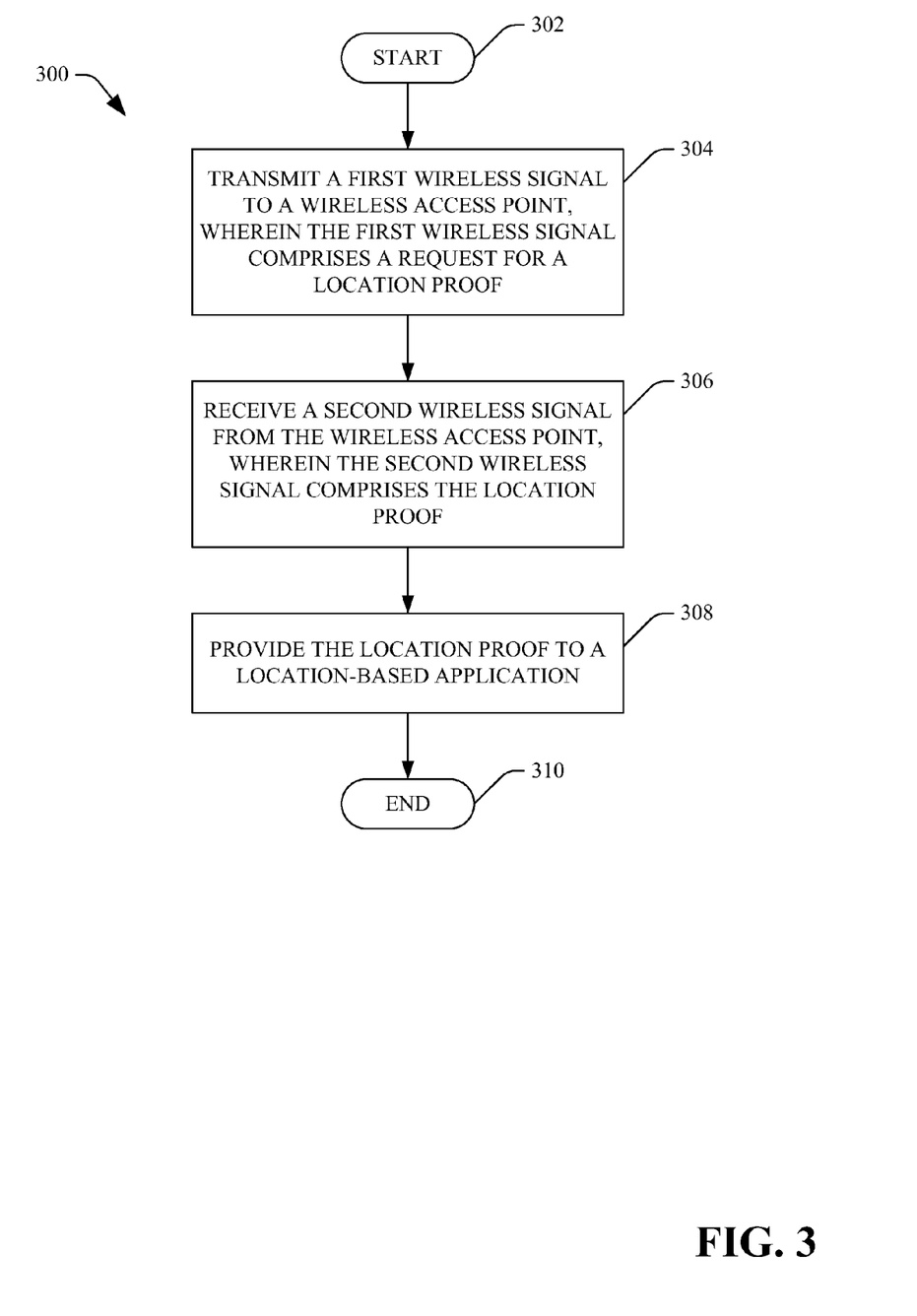
FIG. 3 is a flow diagram that illustrates an example methodology for utilizing a location proof in connection with a wireless computing device.
Figure 4:
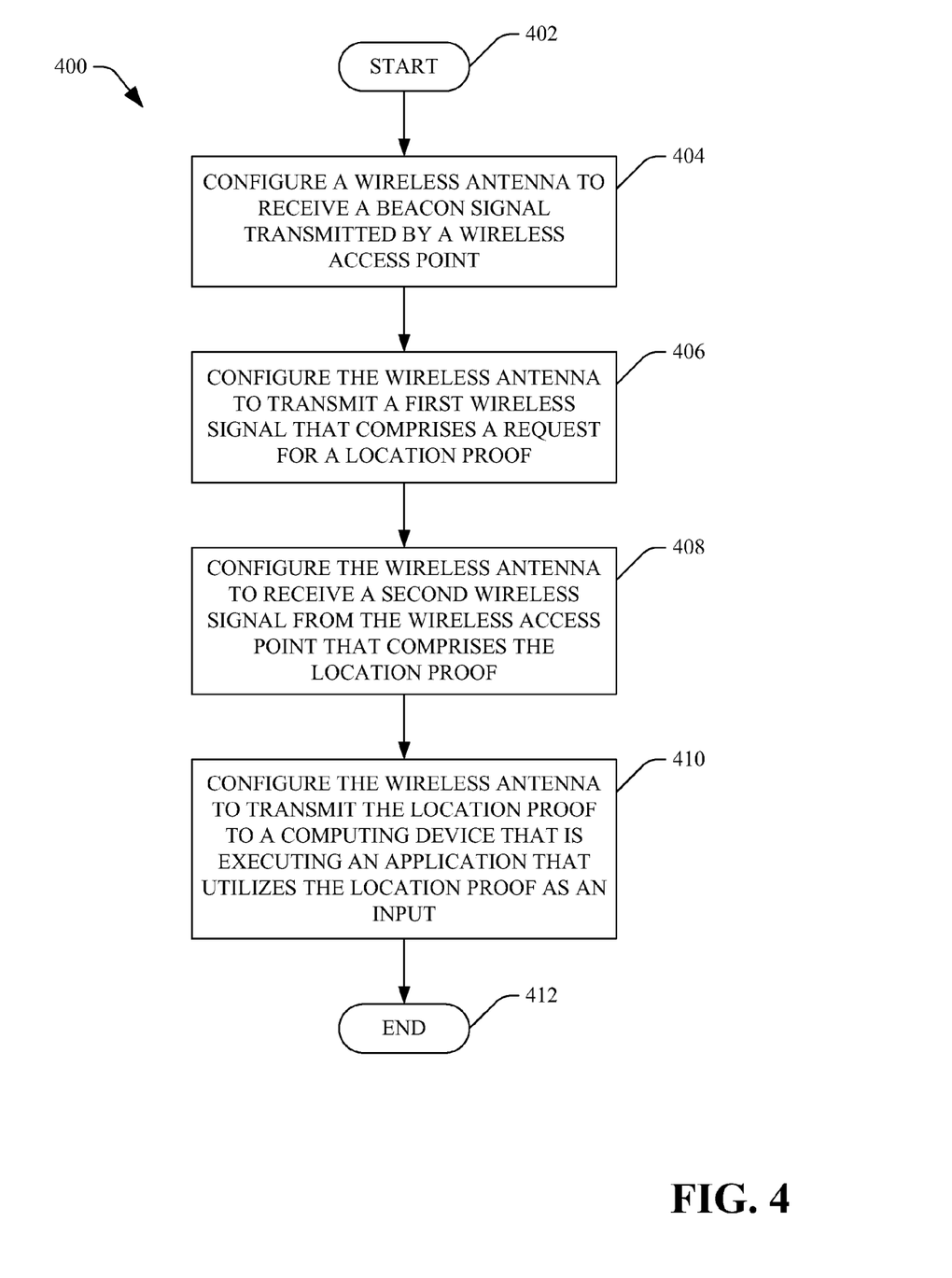
FIG. 4 is a flow diagram that illustrates an example methodology for transmitting a location proof to a computing device that is executing an application that utilizes the location proof as an input.
Figure 5:
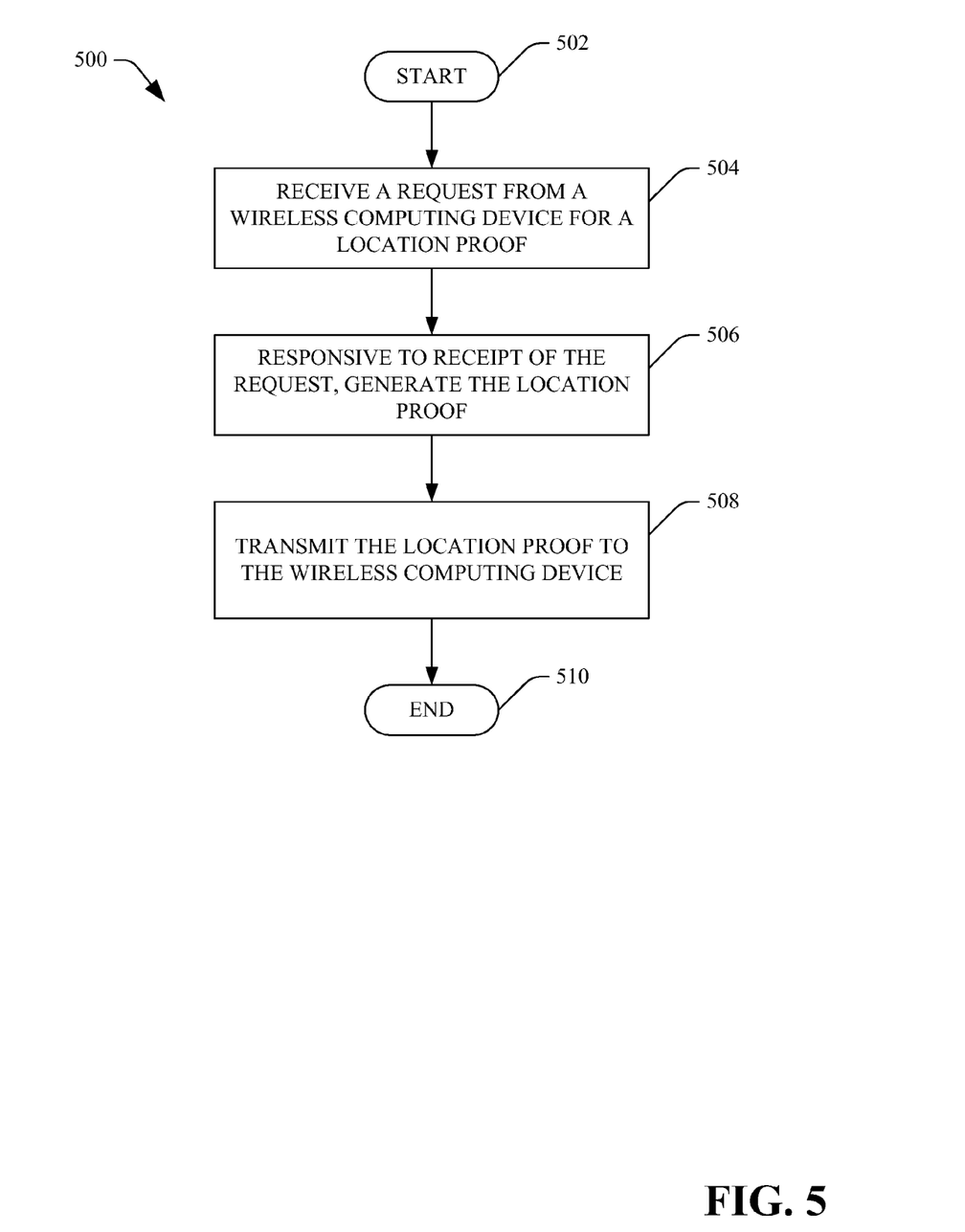
FIG. 5 is a flow diagram that illustrates an example methodology for generating and transmitting a location proof.

With reference now to FIGS. 3-5, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 3, a methodology 300 that facilitates providing a location proof to a location-based application is illustrated. In an example, the methodology 300 may be executed on a client wireless computing device such as a portable telephone, a laptop computer, a portable multimedia player or other suitable electronic device. The methodology 300 begins at 302, and at 304 a first wireless signal is transmitted to a wireless access point. The first wireless signal can comprise a request for a location proof from the wireless access point, wherein the location proof comprises an indication of location of the access point. In an example, the first wireless signal can be transmitted responsive to the wireless computing device receiving a beacon signal from the wireless access point.

At 306, a second wireless signal is received from the wireless access point via an antenna on the wireless computing device. The second wireless signal received by the wireless computing device can comprise the location proof that may include various fields, wherein at least one of such fields comprises data that is indicative of a geographic location of the wireless access point.

At 308, the location proof is provided to a location based application. In an example, a processor on the wireless computing device can execute the application and the location proof can be provided to such application as an input to the application. In another example, the location based application may be executing on a separate computing device and the location proof can be provided from the wireless computing device to the separate computing device. Specifically, the wireless computing device may be configured to transmit a third wireless signal via the antenna to the computing device, wherein the third wireless signal comprises the location proof. The methodology 300 completes at 310.

Turning now to FIG. 4, an example methodology 400 that facilitates providing a location proof to a location based application is illustrated. In an example, the methodology 400 may be executed on a wireless computing device such as a portable laptop computer, a mobile telephone, a portable multimedia player, etc. The methodology 400 starts at 402, and at 404 a wireless antenna is configured to receive a beacon signal transmitted by a wireless access point. The beacon signal can indicate that the wireless access point is capable of transmitting a location proof to the wireless computing device upon receipt of a request for the location proof from the wireless computing device. For instance, the beacon signal may comprise a data packet that indicates a geographic location of the wireless access point. As described above, the location proof is a data packet that comprises information that is indicative of a geographic location of the wireless access point.

At 406, the wireless antenna of the wireless computing device is configured to transmit a first wireless signal to the wireless access point, wherein the first wireless signal comprises a request for the location proof. In an example, the request for the location proof may comprise a public key that is representative of an identity of the user of the mobile computing device. At 408, the wireless antenna is configured to receive a second wireless signal from the wireless access point. The second wireless signal may include the location proof and the location proof can include data that identifies the wireless access point, data that identifies the wireless computing device and a time stamp. The second wireless signal can be received by the wireless computing device subsequent to the wireless computing device transmitting the first wireless signal.

At 410, the wireless antenna is configured to transmit the location proof to a computing device that is executing an application that utilizes the location proof as an input. Several example applications that can utilize a location proof as an input have been described above. The location proof is transmitted to the computing device subsequent to the wireless antenna receiving the second wireless signal from the wireless access point. The methodology 400 completes at 412.

Now referring to FIG. 5, an example methodology 500 that facilitates generating and transmitting a location proof to a wireless computing device is illustrated. The methodology 500 may be configured to execute on a wireless network infrastructure device such as a wireless access point. The methodology 500 starts at 502, and at 504 a request is received from a wireless computing device for a location proof. Prior to act 504, the wireless access point may be configured to transmit a beacon signal that is receivable by the wireless computing device, wherein the beacon signal includes an indication that the wireless access point is capable of generating a location proof.

At 506, responsive to receipt of the request received at 504, the location proof is generated. Contents of the location proof may include data that indicates the geographic location of the wireless access point along with other data as described above. At 508, the location proof is transmitted to the wireless computing device. The methodology 500 completes at 510.

Figure 6:
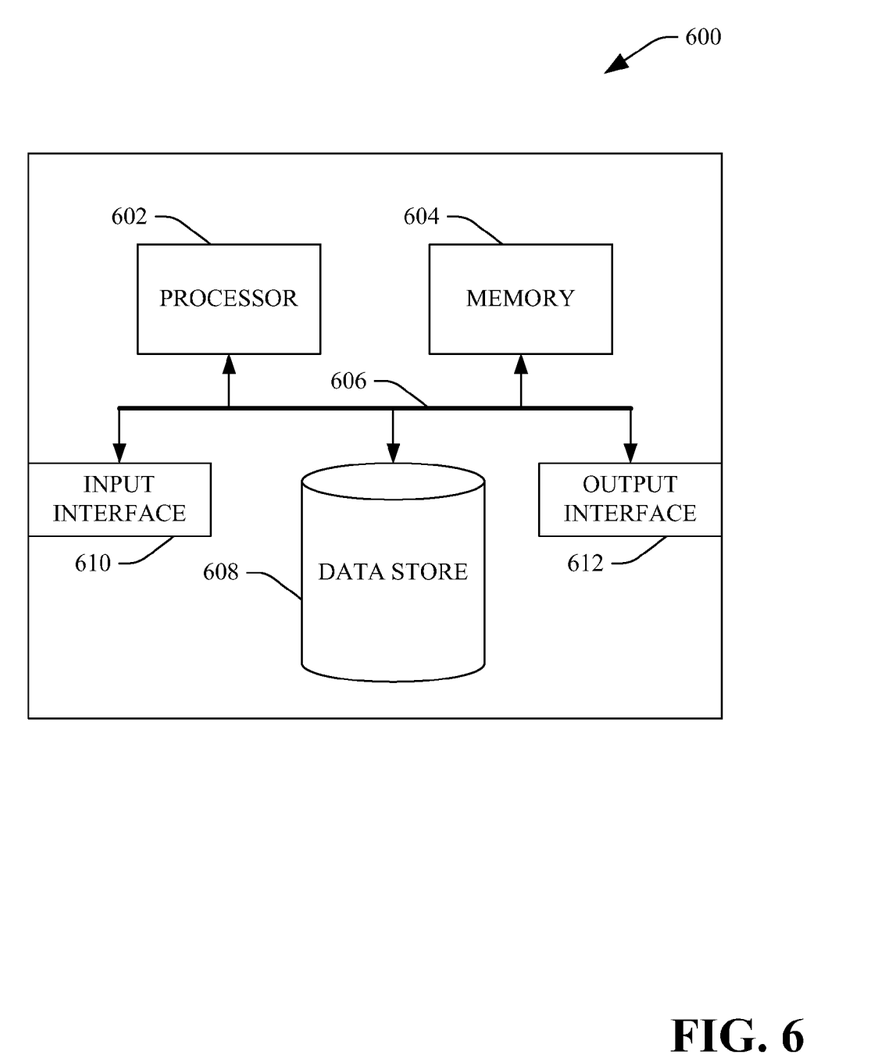
FIG. 6 is an example computing system.

Now referring to FIG. 6, a high-level illustration of an example computing device 600 that can be used in accordance with the systems and methodologies disclosed herein is illustrated. For instance, the computing device 600 may be used in a system that supports receiving location proofs and transmitting such location proofs to a location based application that utilizes location proofs as input. In another example, at least a portion of the computing device 600 may be used in a system that supports generating location proofs and transmitting location proofs to wireless computing devices. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store one or more location proofs, geographical location of a wireless access point, public keys indicating an identity of an individual or a computing device, etc.

The computing device 600 additionally includes a data store 608 that is accessible by the processor 602 by way of the system bus 606. The data store 608 may include executable instructions, location proofs, identities, public keys, etc. The computing device 600 also includes an input interface 610 that allows external devices to communicate with the computing device 600. For instance, the input interface 610 may be used to receive instructions from an external computer device, wireless signals that comprise location proofs, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executable on a mobile computing device, the method comprising:
    transmitting, via an antenna, a first wireless signal to a wireless access point, wherein the first wireless signal comprises a request for a location proof from the wireless access point, the request for the location proof comprising data that identifies the mobile computing device, wherein the location proof comprises an indication of location of the wireless access point and the data that identifies the mobile computing device;
    receiving, via the antenna, a second wireless signal from the access point subsequent to transmitting the first wireless signal, wherein the second wireless signal comprises the location proof;
    responsive to receiving the second wireless signal from the access point, appending a signature to the location proof that identifies the mobile computing device; and
    subsequent to appending the signature to the location proof, providing a data packet that comprises the location proof and the signature to an application executing on a processor, wherein the application executing on the processor validates the location proof based at least in part upon the data that identifies the mobile computing device in the location proof, and wherein the application executing on the processor is a location-based application that performs a computing task based at least in part upon the indication of location in the location proof.

2. The method of claim 1, wherein the processor resides on the mobile computing device.

3. The method of claim 1, further comprising:
    subsequent to receiving the second wireless signal, transmitting, via the antenna, a third wireless signal to a computing device that comprises the processor, wherein the third wireless signal comprises the data packet.

4. The method of claim 1, wherein the indication of location comprises geographic coordinates of the wireless access point.

5. The method of claim 1, wherein the location proof comprises a signature that identifies the wireless access point or an operator of the wireless access point.

6. The method of claim 1, further comprising:
    prior to transmitting the first signal, receiving, via the antenna, a beacon signal from the wireless access point, wherein the beacon signal comprises data that indicates that the wireless access point is capable of generating the location proof.

7. The method of claim 1, wherein the access point is one of a Wi-Fi access point or a cellular telephone tower.

8. The method of claim 1, wherein the location proof further comprises a timestamp that is indicative of a time that the wireless access point transmitted the location proof to the mobile computing device.

9. The method of claim 1, wherein the location proof further comprises data that is indicative of an identity of the wireless access point.

10. The method of claim 9, wherein the data comprises a public key.

11. The method of claim 1, wherein the mobile computing device is one of a portable multimedia device, a portable telephone, or a laptop computer.

12. The method of claim 1, further comprising:
    prior to transmitting the first wireless signal, receiving an indication from a user of the mobile computing device that the user wishes to obtain the location proof.

13. A wireless computing device that includes an antenna configured to transmit and receive wireless signals, the wireless computing device comprising:
    a transmitter component that causes a first wireless signal to be transmitted to a wireless access point via the antenna, wherein the first wireless signal comprises a request for a location proof, wherein the request for the location proof comprises data that identifies the wireless computing device, and wherein the location proof comprises data that is indicative of a geographic location of the wireless access point and the data that identifies the wireless computing device;
    a receiver component that receives, via the antenna, a second wireless signal from the wireless access point, the second wireless signal comprising the location proof, wherein the second wireless signal is received by the receiver component subsequent to the transmitter component causing the first wireless signal to be transmitted to the wireless access point;
    a signature generator component that generates a signature for the wireless computing device and appends the signature to the location proof received in the second wireless signal, the signature identifying the wireless computing device, wherein the transmitter component provides a data packet to a location-based application executing on a processor that performs a computing task based at least in part upon the data that is indicative of the geographic location of the wireless access point, wherein prior to executing the computing task, the application executing on the processor validates the location proof based at least in part upon the data that identifies the wireless computing device in the location proof.

14. The wireless computing device of claim 13 being one of a laptop computer, a portable multimedia player, or a portable telephone.

15. The wireless computing device of claim 13, wherein the transmitter component is configured to transmit a third wireless signal to a computing device that comprises the processor executing the location-based application, wherein the third wireless signal comprises the data packet.

16. The wireless computing device of claim 13, wherein the location proof comprises latitude/longitude coordinates that pertain to the wireless access point.

17. The wireless computing device of claim 13, wherein the receiver component receives a beacon signal transmitted by the wireless access point prior to the receiver component transmitting the first wireless signal, wherein the beacon signal comprises data that indicates that the wireless access point is capable of transmitting the location proof.

18. The wireless computing device of claim 13, wherein the location proof comprises a first public key that is indicative of an identity of the wireless access point, and wherein the data that identifies the wireless computing device is a second public key.

19. A computer-readable medium in a wireless computing device comprising instructions that, when executed by a processor, cause the processor to perform acts comprising:

receiving, via a wireless antenna, a beacon signal transmitted by a wireless access point, wherein the beacon signal indicates that the wireless access point is capable of transmitting a location proof to the wireless computing device, wherein the location proof is a data packet that comprises information indicative of a geographic location of the wireless access point;

responsive to receiving the beacon signal, transmitting, via the wireless antenna, a first wireless signal to the wireless access point, wherein the first wireless signal comprises a request for the location proof, wherein the request for the location proof comprises data that identifies a user of the wireless computing device;

receiving, via the antenna, a second wireless signal from the wireless access point, wherein the second wireless signal comprises the location proof, wherein the location proof comprises data that identifies the wireless access point, the data that identifies the user of the wireless computing device, and a timestamp;

subsequent to receiving the second wireless signal from the wireless access point, appending a signature to the location proof, wherein the signature identifies the user of the wireless computing device; and transmitting, via the antenna, the location proof with the signature appended thereto to a computing device that is executing an application that utilizes the location proof as an input, wherein the application validates the location proof based at least in part upon the signature and the data that identifies the user of the wireless computing device in the location proof.

20. The method of claim 1, wherein the data packet comprises a plurality of location proofs generated by the wireless access point at different respective points in time.

\* \* \* \* \*